US012579433B2

(12) United States Patent　　　　(10) Patent No.:　US 12,579,433 B2
Gao et al.　　　　　　　　　　　　(45) Date of Patent:　　Mar. 17, 2026

(54) RESOURCE USAGE PREDICTION FOR DEEP LEARNING MODEL

(71) Applicant: Microsoft Technology Licensing, LLC, Redmond, WA (US)

(72) Inventors: Yanjie Gao, Redmond, WA (US); Haoxiang Lin, Redmond, WA (US); Yu Liu, Redmond, WA (US); Mao Yang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 902 days.

(21) Appl. No.: 17/783,247

(22) PCT Filed: Dec. 9, 2020

(86) PCT No.: PCT/US2020/064139
§ 371 (c)(1),
(2) Date: Jun. 7, 2022

(87) PCT Pub. No.: WO2021/141716
PCT Pub. Date: Jul. 15, 2021

(65) Prior Publication Data
US 2023/0035451 A1　　Feb. 2, 2023

(30) Foreign Application Priority Data

Jan. 9, 2020　(CN) ......................... 202010025197.X

(51) Int. Cl.
*G06N 3/08*　　　　　(2023.01)
(52) U.S. Cl.
CPC ...................................... *G06N 3/08* (2013.01)
(58) Field of Classification Search
None
See application file for complete search history.

(56) References Cited

U.S. PATENT DOCUMENTS

| | | | |
|---|---|---|---|
| 8,438,120 B2 | 5/2013 | Raaijmakers | |
| 8,468,109 B2 | 6/2013 | Moussa et al. | |
| 10,235,625 B1 | 3/2019 | Walters et al. | |
| 10,257,116 B1 | 4/2019 | Vadera et al. | |
| 12,393,835 B2 * | 8/2025 | Li .......................... | G06N 3/045 |
| 2018/0365065 A1 | 12/2018 | Guttmann et al. | |
| 2019/0213099 A1 * | 7/2019 | Schmidt .................. | G06N 3/08 |

(Continued)

FOREIGN PATENT DOCUMENTS

| | | |
|---|---|---|
| CN | 110390387 A | 10/2019 |
| WO | 2019168724 A1 | 9/2019 |

OTHER PUBLICATIONS

Notice Of Allowance Received for Chinese Application No. 202010025197.X, mailed on Aug. 5, 2025, 04 pages. (English Translation Provided).

(Continued)

*Primary Examiner* — Nasser M Goodarzi
(74) *Attorney, Agent, or Firm* — Schwegman Lundberg & Woessner, P.A.

(57) ABSTRACT

According to implementations of the subject matter described herein, there is provided a solution for predicting the resource usage of the deep learning model. In this solution, information about a deep learning model is obtained, the information comprising first information for describing the deep learning model and second information about an operating environment of a job associated with the deep learning model. The static resource usage of the job is determined based on the first information and a strategy of the job during runtime in the operating environment is determined. Afterwards, resource usage of the job during runtime in the operating environment is predicted based on the strategy and the static resource usage. With this solution, the usage of various resources of the deep learning model, such as computation power consumption, memory consumption, execution time, and the like, under a specific runtime strategy can be accurately predicted.

12 Claims, 6 Drawing Sheets

(56)  References Cited

U.S. PATENT DOCUMENTS

| | | | | |
|---|---|---|---|---|
| 2019/0244102 A1* | 8/2019 | Harvey | ................. | G06F 18/214 |
| 2019/0266015 A1 | 8/2019 | Chandra et al. | | |
| 2021/0286650 A1* | 9/2021 | Henry | ...................... | G06N 3/09 |
| 2022/0147831 A1* | 5/2022 | Hoang | .................... | G06N 20/00 |
| 2025/0053860 A1* | 2/2025 | Zhu | ......................... | G06N 20/00 |
| 2025/0272138 A1* | 8/2025 | Shang Guan | ......... | G06F 9/4843 |

OTHER PUBLICATIONS

Second Office Action Received for Chinese Application No. 202010025197.X, mailed on Apr. 4, 2025, 11 pages. (English Translation Provided).

First Office Action Received for Chinese Application No. 202010025197.X, mailed on Jul. 19, 2024, 15 pages. (English Translation Provided).

International Preliminary Report on Patentability received for PCT Application No. PCT/US23/030881, mailed on Apr. 3, 2025, 06 pages.

Justus, et al., "Predicting the Computational Cost of Deep Learning Models", In Repository of arXiv:1811.11880v1, Nov. 28, 2018, 11 Pages.

Li, et al., "Edge AI: On-Demand Accelerating Deep Neural Network Inference Via Edge Computing", In Journal of IEEE Transactions on Wireless Communications, vol. 19, Issue 1, Jan. 2020, pp. 447-457.

Liu, et al., "On-Demand Deep Model Compression for Mobile Devices: A Usage-Driven Model Selection Framework", In Proceedings of the 16th Annual International Conference on Mobile Systems, Applications, and Services, Jun. 10, 2018, pp. 389-400.

"International Search Report and Written Opinion Issued in PCT Application No. PCT/US20/064139", Mailed Date: Mar. 16, 2021, 12 Pages.

Peng, et al., "Optimus: An Efficient Dynamic Resource Scheduler for Deep Learning Clusters", In Proceedings of the Thirteenth EuroSys Conference, Apr. 23, 2018, 14 Pages.

* cited by examiner

Figure 3A:
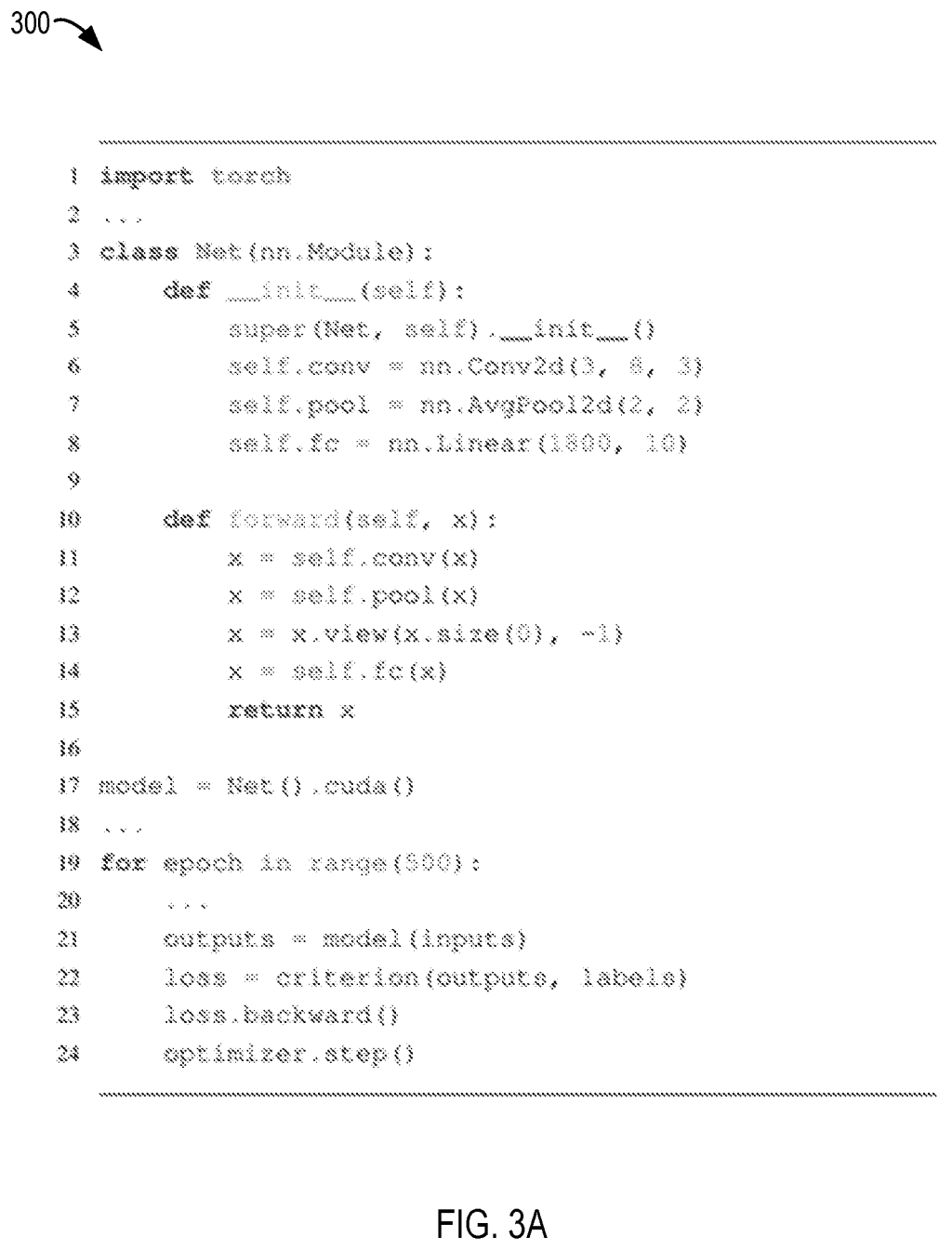

300

```
1   import torch
2   ...
3   class Net(nn.Module):
4       def __init__(self):
5           super(Net, self).__init__()
6           self.conv = nn.Conv2d(3, 6, 3)
7           self.pool = nn.AvgPool2d(2, 2)
8           self.fc = nn.Linear(1800, 10)
9
10      def forward(self, x):
11          x = self.conv(x)
12          x = self.pool(x)
13          x = x.view(x.size(0), -1)
14          x = self.fc(x)
15          return x
16
17  model = Net().cuda()
18  ...
19  for epoch in range(500):
20      ...
21      outputs = model(inputs)
22      loss = criterion(outputs, labels)
23      loss.backward()
24      optimizer.step()
```

```
1   #include <cudnn.h>
2   ...
3   // allocate memory space
4   cudaMalloc(
5       (void**)&input,
6       sizeof(float) * input_size);
7   cudaMalloc(
8       (void**)&filter,
9       sizeof(float) * weight_size);
10  cudaMalloc(
11      (void**)&output,
12      sizeof(float) * output_size);
13  cudaMalloc(
14      (void**)&workspace,
15      sizeof(float) * workspace_size);
16  ...
17  // convolution forward computation
18  cudnnConvolutionForward(
19      ...
20      input,
21      ...
22      filter,
23      ...
24      workspace,
25      ...
26      output);
27  ...
28  // free memory space
29  cudaFree(d_output)
30  ...
```

FIG. 3C

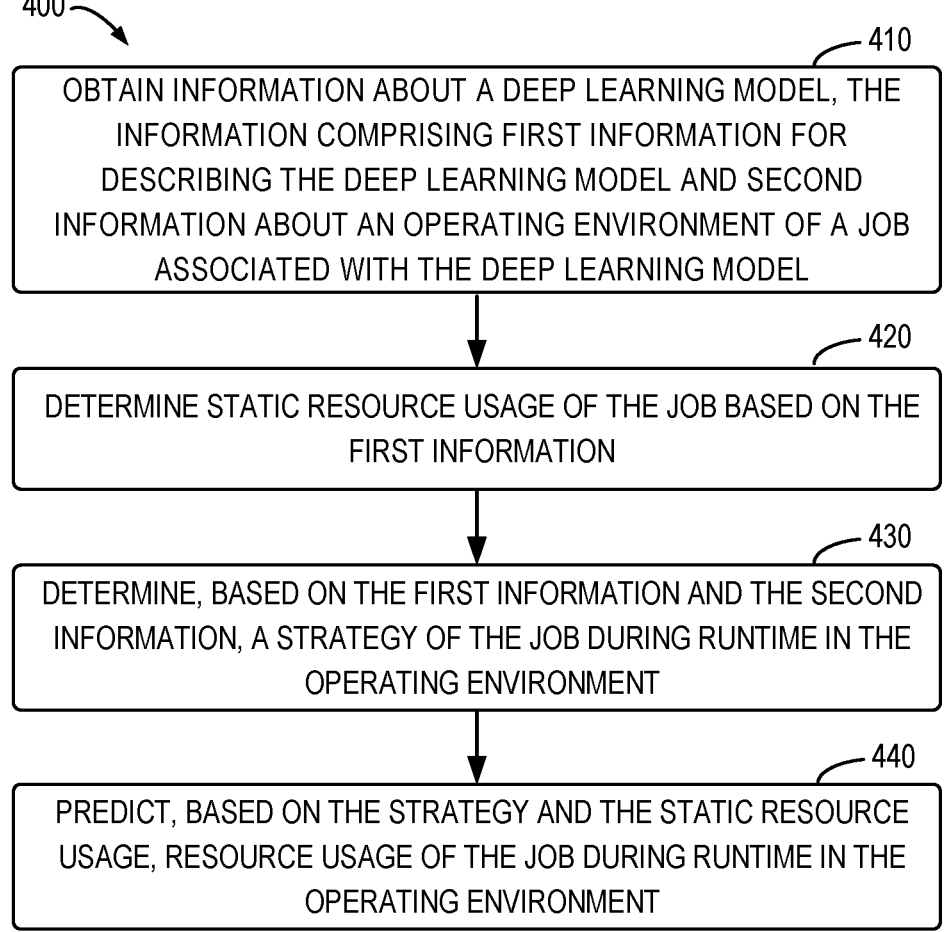

400

410

OBTAIN INFORMATION ABOUT A DEEP LEARNING MODEL, THE INFORMATION COMPRISING FIRST INFORMATION FOR DESCRIBING THE DEEP LEARNING MODEL AND SECOND INFORMATION ABOUT AN OPERATING ENVIRONMENT OF A JOB ASSOCIATED WITH THE DEEP LEARNING MODEL

420

DETERMINE STATIC RESOURCE USAGE OF THE JOB BASED ON THE FIRST INFORMATION

430

DETERMINE, BASED ON THE FIRST INFORMATION AND THE SECOND INFORMATION, A STRATEGY OF THE JOB DURING RUNTIME IN THE OPERATING ENVIRONMENT

440

PREDICT, BASED ON THE STRATEGY AND THE STATIC RESOURCE USAGE, RESOURCE USAGE OF THE JOB DURING RUNTIME IN THE OPERATING ENVIRONMENT

FIG. 4

RESOURCE USAGE PREDICTION FOR DEEP LEARNING MODEL

CROSS-REFERENCE TO RELATED APPLICATION

This application is a U.S. National Stage Filing under 35 U.S.C. 371 of International Patent Application Serial No. PCT/US2020/064139, filed Dec. 9, 2020, and published as WO 2021/141716 A1 on Jul. 15, 2021, which claims priority to Chinese Application No. 202010025197.X, filed Jan. 9, 2020, which applications and publication are incorporated herein by reference in their entirety.

BACKGROUND

In recent years, deep learning has become quite popular in the information technology industry and is changing people's lives. Therefore, it is of great importance for productivity improvement to understand accurate resource usage of a deep learning job throughout its entire life cycle. If the resource usage of the deep learning job can be accurately predicted, deep learning developers can select the optimal model parameters in advance to avoid failure caused by insufficient resources and obtain the optimal model performance under resource constraints. Besides, if the resource usage of the deep learning job can be accurately predicted, an execution plan of the deep learning job may be dynamically adjusted to ensure that the deep learning job is finished with a given Service Level Agreement (SLA) (e.g., meeting a certain time or budget requirement).

SUMMARY

According to implementations of the subject matter described herein, there is provided a solution for predicting the resource usage of the deep learning model. In this solution, information about a deep learning model is obtained, the information comprising first information for describing the deep learning model and second information about an operating environment of a job associated with the deep learning model. The static resource usage of the job is determined based on the first information and a strategy of the job during runtime in the operating environment is determined based on the first information and the second information. Afterwards, resource usage of the job during runtime in the operating environment is predicted based on the strategy and the static resource usage. This solution can accurately predict the usage of various resources of the deep learning model under a specific runtime strategy, such as computation power consumption, memory consumption, execution time, and the like. Moreover, the solution is of an extensible architecture, so as to support different types of deep learning frameworks.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 3A illustrates an example program code of the training job of the deep learning model;

FIG. 3C illustrates example codes in a deep neural network codebase corresponding to the convolution operator in the forward propagation process; and FIG. 4 illustrates a flowchart of an example method for predicting the resource usage of the deep learning model in accordance with implementations of the subject matter described herein.

Throughout the drawings, the same or similar reference signs refer to the same or similar elements.

DETAILED DESCRIPTION

Figure 1:
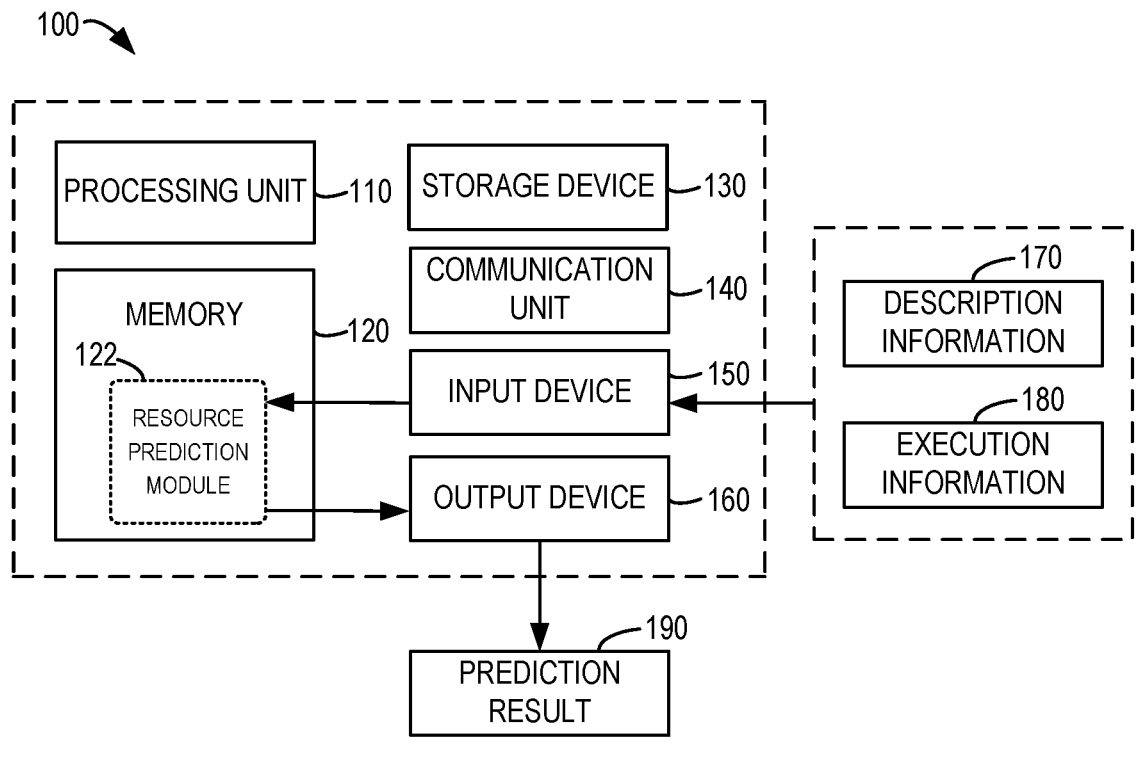
FIG. 1 illustrates a block diagram of a computing device which can implement a plurality of implementations of the subject matter described herein.

The subject matter described herein will now be discussed with reference to several example implementations. It is to be understood these implementations are discussed only for the purpose of enabling persons skilled in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

As used herein, the term "neural network model" ("model" for short) can handle inputs and provide corresponding outputs and it usually includes an input layer, an output layer and one or more hidden layers between the input and output layers. The model used in the deep learning applications (hereinafter referred to as "deep learning model" or "deep neural network") usually includes a plurality of hidden layers to extend the depth of the network. Individual layers of the neural network model are connected in sequence, such that an output of a preceding layer is provided as an input for a following layer, where the input layer receives the input of the neural network model while the output of the output layer acts as the final output of the neural network model. Each layer of the neural network model includes one or more nodes (also known as processing nodes or neurons) and each node processes the input from the preceding layer. In the text, the terms "neural network," "model," "network" and "neural network model" may be used interchangeably.

As described above, deep learning recently has become quite popular in the information technology industry and is changing people's lives. Therefore, it is of great importance for productivity improvement to understand accurate resource usage of a deep learning job throughout its entire life cycle. If the resource usage of the deep learning job can be accurately predicted, deep learning developers can select the optimal model parameters in advance to avoid failure caused by insufficient resources and obtain the optimal model performance under resource constraints. Besides, if the resource usage of the deep learning job can be accurately predicted, an execution plan of the deep learning job may be dynamically adjusted to ensure that the deep learning job is finished with a given SLA (e.g., meeting a certain time or budget requirement).

In some conventional solutions, the execution time of the deep learning job can only be predicted based on the description information of the deep learning model and the specifications of the hardware performing the deep learning job, but other resource consumptions of the deep learning job, such as computation power consumption and memory consumption cannot be predicted. In addition, some conventional solutions usually depend on the machine learning method and are applicable to limited types of description information and restricted types of frameworks of the machine learning model. Moreover, the prediction results provided by the conventional solutions often lack interpretability, for example, they fail to help the deep learning developers find a bottleneck of the model and adjust the model parameters so as to improve the performance of the model.

In accordance with implementations of the subject matter described herein, there is provided a solution for predicting resource usage of a deep learning model. In this solution, the information about the deep learning model is obtained, where the information includes the first information describing the deep learning model and the second information about an operating environment of a job associated with the deep learning model. Static resource usage of the job is determined based on the first information and a strategy of the job during runtime in the operating environment is determined based on the first information and the second information. Afterwards, the resource usage of the job during runtime in the operating environment is predicted according to the strategy and the static resource usage.

In this way, the usage of various resources of the deep learning model under a specific runtime strategy, such as computation power consumption, memory consumption, execution time, and so on, can be accurately predicted by using this solution. Moreover, the solution can support various types of inputs and has an extensible architecture, so as to support different types of deep learning frameworks. The prediction result provided by this solution is interpretable and is able to engage with other deep learning system assemblies (e.g., AutoML system) or an artificial intelligence platform to increase the productivity of the deep learning. For example, the prediction result can help the deep learning developers find a bottleneck of the model, such that the performance of the model is improved by adjusting the model parameters; the prediction result also allows other deep learning system assemblies (e.g., AutoML system) to tailor the search space of the model parameters of the deep learning model in advance so as to improve the search efficiency of the model parameters; the prediction result facilitates optimization of the job execution strategy of the artificial intelligence platform, thereby enhancing the resource utilization rate, and the like.

Various example implementations of the solution are described in detail below with reference to the drawings.

FIG. 1 illustrates a block diagram of a computing device 100 that can implement a plurality of implementations of the subject matter described herein. It should be understood that the computing device 100 shown in FIG. 1 is only exemplary and shall not constitute any limitation on the functions and scopes of the implementations described by the subject matter described herein. As shown in FIG. 1, the computing device 100 includes a computing device 100 in the form of a general purpose computing device. Components of the computing device 100 may include, but is not limited to, one or more processors or processing units 110, a memory 120, a storage device 130, one or more communication units 140, one or more input devices 150, and one or more output devices 160.

In some implementations, the computing device 100 may be implemented as various user terminals or service terminals. The service terminals may be servers, large-scale computing devices, and the like provided by a variety of service providers. The user terminal, for example, is a mobile terminal, a fixed terminal or a portable terminal of any type, including a mobile phone, a site, a unit, a device, a multimedia computer, a multimedia tablet, Internet nodes, a communicator, a desktop computer, a laptop computer, a notebook computer, a netbook computer, a tablet computer, a Personal Communication System (PCS) device, a personal navigation device, a Personal Digital Assistant (PDA), an audio/video player, a digital camera/video, a positioning device, a television receiver, a radio broadcast receiver, an electronic book device, a gaming device or any other combination thereof consisting of accessories and peripherals of these devices or any other combination thereof. It may also be predicted that the computing device 100 can support any type of user-specific interface (such as a "wearable" circuit, and the like).

The processing unit 110 may be a physical or virtual processor and may execute various processing based on the programs stored in the memory 120. In a multi-processor system, a plurality of processing units executes computer-executable instructions in parallel to enhance parallel processing capability of the computing device 100. The processing unit 110 can also be known as a central processing unit (CPU), microprocessor, controller and microcontroller.

The computing device 100 usually includes a plurality of computer storage mediums. Such mediums may be any attainable medium accessible by the computing device 100, including but not limited to, a volatile and non-volatile medium, a removable and non-removable medium. The memory 120 may be a volatile memory (e.g., a register, a cache, a Random Access Memory (RAM)), a non-volatile memory (such as, a Read-Only Memory (ROM), an Electrically Erasable Programmable Read-Only Memory (EEPROM), flash), or any combination thereof.

The storage device 130 may be a removable or non-removable medium, and may include a machine-readable medium (e.g., a memory, a flash drive, a magnetic disk) or any other medium, which may be used for storing information and/or data and be accessed within the computing device 100. The computing device 100 may further include additional removable/non-removable, volatile/non-volatile storage mediums. Although not shown in FIG. 1, there may be provided a disk drive for reading from or writing into a removable and non-volatile disk and an optical disc drive for reading from or writing into a removable and non-volatile optical disc. In such cases, each drive may be connected to a bus (not shown) via one or more data medium interfaces.

The communication unit 140 implements communication with another computing device via a communication medium. Additionally, functions of components of the computing device 100 may be realized by a single computing cluster or a plurality of computing machines, and these computing machines may communicate through communication connections. Therefore, the computing device 100 may operate in a networked environment using a logic connection to one or more other servers, a Personal Computer (PC) or a further general network node.

The input device 150 may be one or more various input devices, such as a mouse, a keyboard, a trackball, a voice-input device, and the like. The output device 160 may be one or more output devices, e.g., a display, a loudspeaker, a printer, and so on. The computing device 100 may also communicate through the communication unit 140 with one or more external devices (not shown) as required, where the external device, e.g., a storage device, a display device, and so on, communicates with one or more devices that enable users to interact with the computing device 100, or with any device (such as a network card, a modem, and the like) that enable the computing device 100 to communicate with one or more other computing devices. Such communication may be executed via an Input/Output (I/O) interface (not shown).

In some implementations, apart from being integrated on an individual device, some or all of the respective components of the computing device 100 may also be set in the form of a cloud computing architecture. In the cloud computing architecture, these components may be remotely arranged and may cooperate to implement the functions described by the subject matter described herein. In some implementations, the cloud computing provides computation, software, data access and storage services without informing a terminal user of physical locations or configurations of systems or hardware providing such services. In various implementations, the cloud computing provides services via a Wide Area Network (such as Internet) using a suitable protocol. For example, the cloud computing provider provides, via the Wide Area Network, the applications, which can be accessed through a web browser or any other computing component. Software or components of the cloud computing architecture and corresponding data may be stored on a server at a remote location. The computing resources in the cloud computing environment may be merged or spread at a remote datacenter. The cloud computing infrastructure may provide, via a shared datacenter, the services even though they are shown as a single access point for the user. Therefore, components and functions described herein can be provided using the cloud computing architecture from a service provider at a remote location. Alternatively, components and functions may also be provided from a conventional server, or they may be mounted on a client device directly or in other ways.

The computing device 100 may be used for implementing prediction of resource usage for the deep learning model in various implementations of the subject matter described herein. The memory 120 may include a resource prediction module 122 having one or more program instructions. The module may be accessed and operated by the processing unit 110 to implement functions of various implementations described herein.

When predicting the resource usage of the deep learning model, the computing device 100 may receive, via the input device 150, information about the deep learning model to be trained. The information may include information 170 for describing the deep learning model (also referred to as "description information" or "the first information" herein) and information 180 about the operating environment of a job associated with the deep learning model (also referred to as "execution information" or "the second information" herein). The "job" herein is also referred to as "deep learning job," which may include a job for training the deep learning model ("training job" for short) or a job for inference with a trained deep learning model ("inference job" for short). In some implementations, the description information 170 for example may include configuration parameters (e.g., a hyper-parameter) of the deep learning model. Additionally or alternatively, the description information 170, for example, may include a model file of the deep learning model (e.g., a binary model file) and/or program codes of the job (training job or inference job) associated with the deep learning model. For example, the execution information 180 may include the framework type of the deep learning model (e.g., TensorFlow or PyTorch), the specifications and number of at least one computing device (e.g., a central processing unit/graphical processing unit, a network and storage device, and the like) for executing the job in the operating environment, and/or the execution strategy of the job on the at least one computing device. For example, the execution strategy may indicate whether the job is executed on a single machine or on a plurality of machines, executed in a serial manner or a parallel manner, executed by a single graphical processing unit or a plurality of graphical processing units, whether it is executed in a distributed manner, and the like.

The description information 170 and the execution information 180 may be input to the resource prediction module 122 in the memory 120. The resource prediction module 122 may predict, based on the description information 170 and the execution information 180, the resource usage 190 (also referred to as "prediction result 190") of the job associated with the deep learning model at runtime. For example, the prediction result 190 may indicate computation power consumption, memory consumption (e.g., consumption of the main memory in a central processing unit or memory consumption of a graphical processing unit) and/or I/O resource consumption of the job during runtime based on a given execution strategy in a specific operating environment. Besides, the prediction result 190 for example may also indicate other resource consumptions of the job during runtime, such as execution time, power consumption, the budget to be consumed on a certain AI platform, and the like. Other resource consumptions, for example, may be determined based on the computation power consumption and/or the memory consumption.

Figure 2:
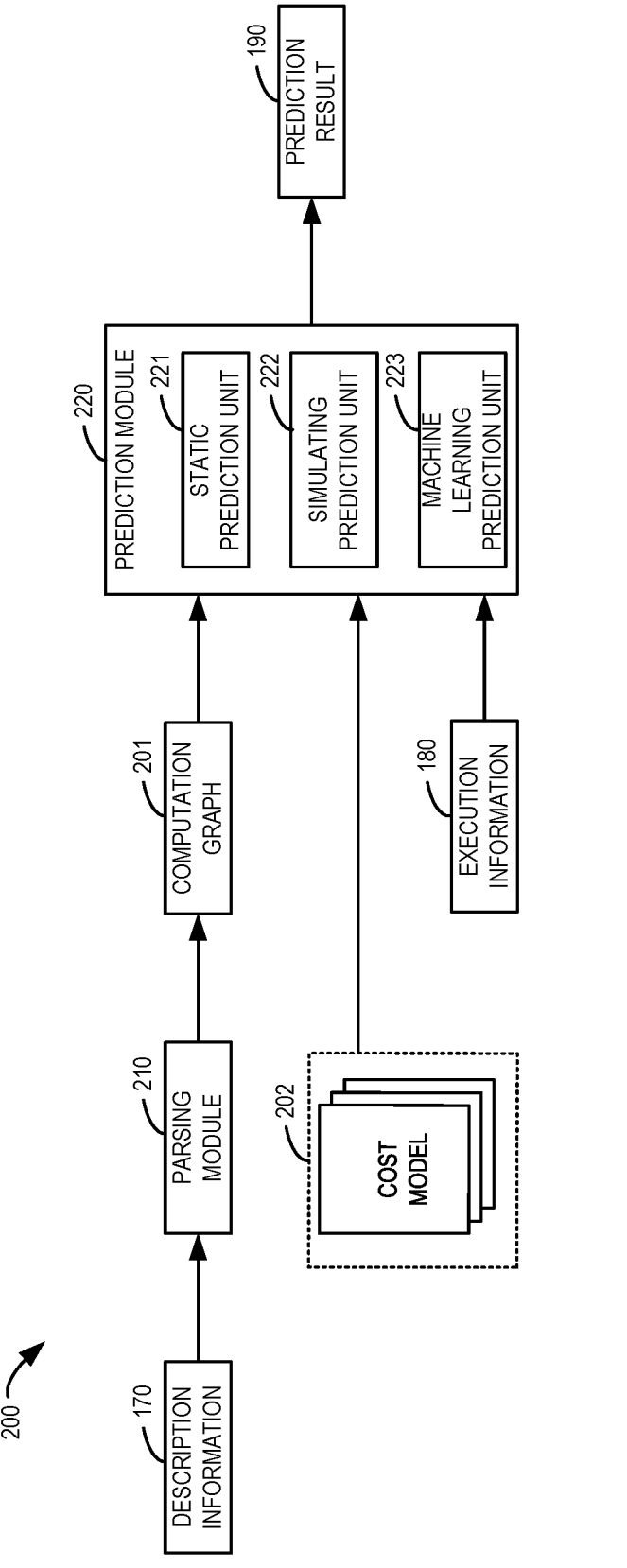
FIG. 2 illustrates a block diagram of an example system for predicting the resource usage of the deep learning model in accordance with implementations of the subject matter described herein.

FIG. 2 illustrates a block diagram of an example system 200 for predicting the resource usage of the deep learning model in accordance with implementations of the subject matter described herein. The system 200 may be implemented in the computing device 100 of FIG. 1, for example, at the resource prediction module 122. As shown in FIG. 2, the system 200 may include a parsing module 210 and a prediction module 220.

In some implementations, the parsing module 210 may be configured to parse the description information 170 of the deep learning model to generate a computation graph 201 corresponding to the deep learning model. As described above, the description information 170 for example may include the model file (e.g., a binary model file) of the deep learning model, program codes for training the deep learning model and/or configuration parameters (e.g., hyper-parameters) of the deep learning model, and so on. In some implementations, the parsing module 210 may generate the computation graph 201 based on a program analysis method. The generated computation graph 201 may include a plurality of nodes corresponding to a plurality of operators (e.g., each node corresponding to one operator) in the deep learning model and the edges connecting the plurality of nodes may indicate dependency among the plurality of operators. The generation of the computation graph is illustrated below with reference to FIGS. 3A and 3B.

FIG. 3A illustrates an example program code 300 of a training job of a deep learning model. The example program code 300 may be an example of the description information 170 shown in FIG. 2. For example, the program code 300 uses a PyTorch framework and constructs a convolution neural network composed of a convolution operator (e.g., the self.conv( ) shown in the program code 300), a pooling operator (e.g., the self.pool( ) shown in the program code 300) and a fully connected operator (e.g., the self.fc( ) shown in the program code 300). As a popular deep learning framework, PyTorch employs a hybrid programming model, where the Python code describes a high-level model structure of the deep learning program. Although the PyTorch framework is taken as an example to illustrate the generation of the computation graph, it should be appreciated that this is provided only for the purpose of illustration, rather than limiting the protection scope of the subject matter described herein. Implementations of the subject matter described herein are also applicable to other similar frameworks, such as TensorFlow, MXNet, and the like.

Figure 3B:
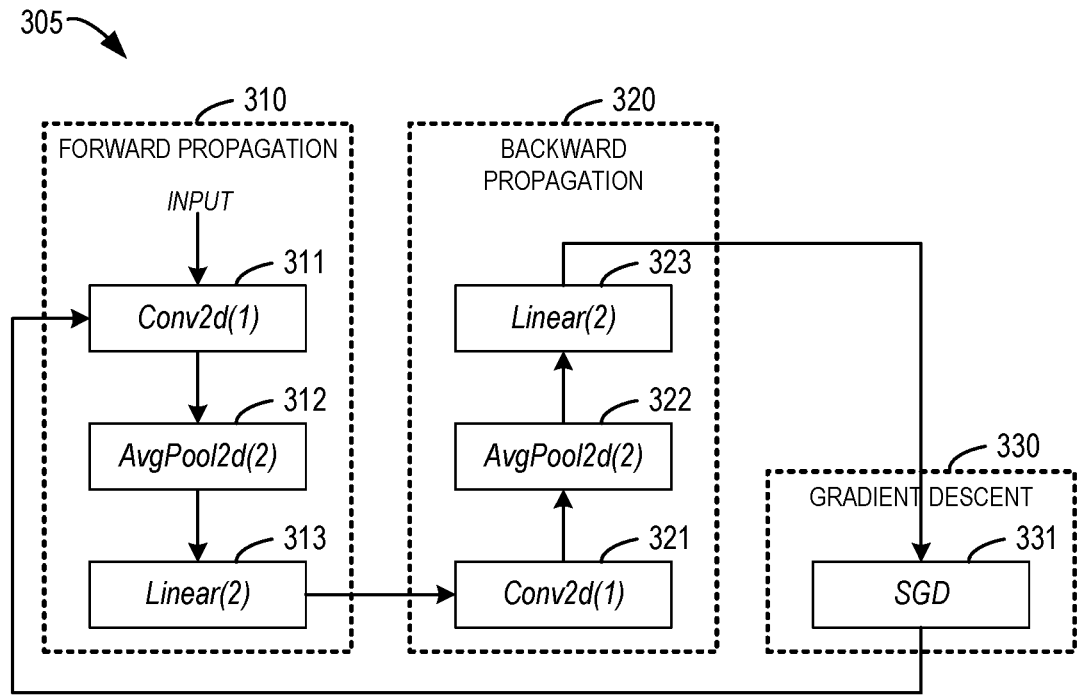
FIG. 3B illustrates an example computation graph corresponding to the training job of the deep learning model in accordance with implementations of the subject matter described herein.

FIG. 3B illustrates an example computation graph 305 of the model training job corresponding to the example program code 300 of FIG. 3A in accordance with implementations of the subject matter described herein. The example computation graph 305 may be an example of the computation graph 201 shown in FIG. 2.

In some implementations, the execution of the deep neural network may be represented as a directed acyclic computation graph $N=\left\langle \{u^{(i)}, u^{(j)})\}\right\rangle$, where each node $u^{(i)}$ denotes the call of the operator $f^{(i)}$ to be executed on a Graphical Processing Unit (GPU) and the directed edge $\{(u^{(i)}, u^{(j)})\}$ pointing from the output of the node $u^{(i)}$ to the input of the node $u^{(j)}$ indicates the execution dependency.

As illustrated by the example computation graph 305, the training program 300 of the deep learning model is a cyclic program which includes three phases: a forward propagation phase 310 corresponding to the codes in lines 21-22 of FIG. 3A; a backward propagation phase 320 corresponding to the codes in line 23 of FIG. 3A; and a gradient descent phase 330 corresponding to the codes in line 24 of FIG. 3A. As shown in FIG. 3B, the forward propagation phase 310, for example, may include three nodes 311, 312 and 313, which corresponds to respective operators in the deep learning model, separately. For example, the node 311 corresponds to the convolution operator (as shown by the codes in line 11 of FIG. 3A); the node 312 corresponds to the pooling operator (as shown by the codes in line 12 of FIG. 3A); and the node 313 corresponds to the fully connected operator (as shown by the codes in line 14 of FIG. 3A). The backward propagation phase 320, for example, may include three nodes 321, 322 and 323 corresponding back to the operators in the forward propagation phase 310. For example, the node 321 corresponds to the convolution operator; the node 322 corresponds to the pooling operator and the node 323 corresponds to the fully connected operator. The gradient descent phase 330, for example, may include a node 331 which corresponds to the gradient descent operator (as shown by the codes in line 24 of FIG. 3A). Directed edges between different nodes represent the direction of data flows between various operators.

Returning to FIG. 2, in some implementations, the computation graph 201, the cost model 202 (also referred to as "resource prediction model") corresponding to a plurality of operators in the computation graph 201, and the execution information 180 may be provided to the prediction module 220 for predicting the resource usage of the deep learning job at runtime (i.e., the prediction result 190). As described above, the execution information 180, for example, may include the framework type of the deep learning model (e.g., TensorFlow, PyTorch, and the like), the specifications and number of at least one computing device (e.g., central processing unit/graphical processing unit, network and storage device etc.) for executing the deep learning job in the operating environment, and/or the execution strategy of the deep learning job on the at least one computing device (e.g., the execution strategy may indicate whether the job is executed on a single machine or on a plurality of machines, executed in a serial manner or a parallel manner, executed by a single graphical processing unit or a plurality of graphical processing units, whether executed in a distributed manner, and the like). The prediction result 190 for example may indicate computation power consumption, memory consumption (e.g., the consumption of the main memory in the central processing unit or the memory consumption of the graphical processing unit), and/or I/O resource consumption of the deep learning job during runtime based on a given execution strategy in a specific operating environment indicated by the execution information 180. Besides, the prediction result 190 for example may also indicate other resource consumptions of the deep learning job, such as execution time, power consumption and budget to be consumed, during runtime in a specific operating environment. Other resource consumptions, for example, may be determined based on the computation power consumption and/or the memory consumption.

As shown in FIG. 2, in some implementations, the prediction module 220 for example may include a static prediction unit 221, a simulating prediction unit 222 and a machine learning prediction unit 223. It should be appreciated that the functional units included in the prediction module 220 shown in FIG. 2 are only for the purpose of illustration, rather than limiting the scope of protection of the subject matter described herein. In the specific implementations, the prediction module 220 may include additional functional units or omit the functional units shown in FIG. 2.

In some implementations, the static prediction module 221 may predict, based on the computation graph 201 and the cost module 202, respective static resource usage of a plurality of operators in the computation graph. In some implementations, the static resource usage of the operator may include the memory consumption of the operator (e.g., the sizes of output buffer, weight buffer, temporary workspace, and the like), the computation power consumption of the operator (e.g., floating point computation and the like), and the I/O resource consumption of the operator. The static prediction unit 221 may determine the static resource usage of the deep learning job based on the respective static resource usage of a plurality of operators. In some implementations, the simulating prediction unit 222 may determine, based on the computation graph 201 and the execution information 180, the strategy of the deep learning job, such as the resource allocation strategy and execution strategy, during runtime in the specific operating environment indicated by the execution information 180. The simulating prediction unit 222 may further execute a simulation analysis for the resource consumption based on the determined strategy, so as to adjust the static resource usage of the determined learning job based on the simulation result, thereby obtaining the resource usage 190 of the deep learning job during runtime. Additionally or alternatively, the machine learning prediction unit 223 may employ a trained machine learning model (or a deep learning model) to generate a parameter for optimizing the predicted resource usage 190 of the deep learning job at runtime and optimize and calibrate the resource usage 190 of the deep learning job during runtime based on the parameter, so as to improve the accuracy of the resource usage prediction.

In some implementations, the cost model for predicting the resource consumption may be pre-built for each of the plurality of operators in the computation graph 201. In some implementations, the cost model may be built based on the computation graph and may be universal to different deep learning frameworks (such as TensorFlow, PyTorch, MXNet and the like). Alternatively, in some implementations, corresponding cost models may be built based on different deep learning frameworks.

In some implementations, same or different cost models may be built respectively for different resources (e.g., computation power, main memory/GPU memory, network I/O, and the like) consumed by a given operator (e.g., a certain operator) for estimating respective resource consumptions caused by the operator. The memory resource is taken as an example below to describe the building of the cost model.

Taking the code 300 of FIG. 3A as an example, the Python code shown in FIG. 3A hides the details of tensor distribution and release. When the operator corresponding to each node in the computation graph 305 shown in FIG. 3B is executed on a GPU, it may correspond to codes in a respective deep neural network codebase (e.g., cuDNN). FIG. 3C illustrates an example 315 of the cuDNN code corresponding to the convolution operator in the forward propagation process. For example, the code in line 6 of FIG. 3A is executed as the example code 315 shown in FIG. 3C. In some implementations, the specific tensor distribution requirement for the operator may be determined from the cuDNN code and a cost model corresponding to the operator is built based on the cuDNN application programming interface and the implementation of the operator specific to a given framework.

For example, the tensor type of the convolution operator and its detailed tensor distribution and release in the forward and backward propagation process may be determined by analyzing the example cuDNN code 315 shown in FIG. 3C, so as to determine a cost model corresponding to the convolution operator. For example, as illustrated by the codes in lines 4-15 of FIG. 3C, it is first required to allocate the required buffer area (input, filter, output, workspace, and the like) via a corresponding API. As a closed codebase, the cuDNN may be configured to only support various convolution algorithms, which utilize different sizes of workspaces according to the tradeoff between speed and space. Accordingly, the size of the workspace may be obtained through a corresponding API or estimated by building a corresponding cost model based on a known algorithm. Afterwards, the convolution operation is executed as shown by the codes in lines 20-26 of FIG. 3C. Once the convolution operation is executed, the allocated buffer area, if not relied on by other operators, may be released through the corresponding API (as indicated by the codes in line 29 of FIG. 3C). In this way, the example code 315 is analyzed to build a cost model for the memory consumption of the convolution operator, so as to predict the memory consumption of the convolution operator. Similarly, a cost model may also be pre-built for other types of resource consumptions of the convolution operator.

In some implementations, a unified cost model may be built for estimating the following resource consumptions: memory consumption, computation power consumption (e.g., consumed floating point operation), consumption of I/O related resources (e.g., I/O time, throughput, and the like), other resource consumption (e.g., execution time, budget, power consumption obtained from the computation power consumption and the memory consumption). The GPU memory and the Floating Point Operation (FLOPs) are taken as examples below to explain the building of the cost model in details.

As described above, the execution of the deep neural network may be represented as a directed acyclic computation graph $$N = \left\langle \{u^{(i)}\}_{i=1}^{n}, \{(u^{(i)}, u^{(j)})\} \right\rangle,$$

where each node $u^{(i)}$ denotes the call of the operator $f^{(i)}$ to be executed on the Graphical Processing Unit (GPU) and the directed edge $\{(u^{(i)}, u^{(j)})\}$ pointing from the output of the node $u^{(i)}$ to the input of the node $u^{(j)}$ indicates the execution dependency.

In some implementations, the total memory consumption M of the deep neural network may be determined by accumulating the memory consumptions of all operators as shown by the following equation (1).

$$M = (M_{cg} + M_r)(1 + \alpha) \tag{1}$$

where $M_{cg}$ represents a sum of the memory consumptions of all operators determined based on the computation graph; $M_r$ represents the memory consumption at runtime and $\alpha$ is a preset ratio. For example, $\alpha$ may be set to 0 in most cases. When the predicted resource usage is optimized using the machine learning model, $\alpha$ may be set to a ratio of the potential memory consumption predicted by the machine learning model to the total memory consumption.

Upon estimating $M_{cg}$, the memory M(u) consumed by each operator u may be added:

$$M_{cg} = \sum_{u} M(u) \tag{2}$$

where the memory consumption at runtime $M_r$ may include the preserved GPU memory of a specific hardware platform (such as for kernel startup or cuDNN processing) and allocator debris $M_f$ as shown in equation (3) below.

$$M_r = M_c + M_f \tag{3}$$

The consumed memory M(u) for each operator u may include a sum of one or more of: a weight buffer W(u), an output buffer O(u), and a temporary buffer E(u) as shown in equation (4) below.

$$M(u) = W(u) + O(u) + E(u) \tag{4}$$

where the weight buffer W(u) may include a buffer $W_m(u)$ for buffering the weight of the operator and a buffer $W_g(u)$ for buffering the gradient of the weight of the operator as shown in equation (5) below.

$$W(u) + W_m(u) + W_g(u) \tag{5}$$

The output buffer O(u) may include a buffer $O_o(u)$ for buffering the forward propagation output of the operator and a buffer $O_g(u)$ for buffering derivatives of the output of the operator in the backward propagation phase as shown in equation (6) below.

$$O(u) = O_o(u) + O_g(u) \tag{6}$$

It should be noted that because the input of an operator is the output of a previous operator, the above statistics of the buffer should avoid repetition. The temporary buffer area E(u) may include: a temporary workspace $E_w(u)$ (e.g., workspace of the cuDNN convolution operator) and a temporary buffer $E_v(u)$ consumed by other operators in the deep neural network codebase as shown by the equation (7) below.

$$E(u)=E_w(u)+E_v(u) \tag{7}$$

The above memory consumption estimate is a complete set of the memory consumption estimates for the operators and the memory consumption of different operators may be a subset of the above complete set.

In some implementations, the total computation power consumption $F_{cg}$ (e.g., total floating point operation) of the deep neural network may be determined by accumulating the computation power of all operators as shown by the equation (8) below.

$$F_{cg} = \sum_u F(u) \tag{8}$$

where the computation power consumption of each operator u is represented as F(u).

Taking the convolution operator as an example, it is assumed that the convolution operator is implemented as a sliding window and its floating point operation may be determined according to the scale of the related matrix operation. Here, it is assumed that the size of a group of input feature graphs is N×C×H×W for the convolution operator, where N represents the number of the input feature graphs, C represents the channel number and H×W represents the shape of each feature graph (e.g., the number of rows and columns of the corresponding matrix). It is also assumed that the size of a group of convolution filters adopted by the convolution operator is K×C×R×S, where K represents the number of the convolution filters, C represents the channel number and R×S represents the shape of each convolution filter (e.g., the number of rows and columns of the corresponding matrix). Moreover, it is assumed that the output of the convolution operator is N×K feature graphs, where the shape of each feature graph is P×Q (e.g., which may be determined according to the shape of input feature graph and filter in combination with stride and filling parameters). On the assumption that the floating point operation for one floating point multiplication-adding operation is 2, the total floating point operation of the convolution operator in the forward propagation phase is 2×K×C×R×S× N×P×Q. Correspondingly, the floating point operation of other operators may be determined in a similar approach.

The building of the cost model in accordance with implementations of the subject matter described herein has been described above with the memory consumption and the computation power consumption acting as the examples. It should be appreciated that the code model for other types of resource consumptions may also be built in a similar way and will not be repeated herein.

The above building of the cost model only considers the static estimate of the resource usage. Taking the memory consumption as an example, when the deep learning job is being operated, the framework (e.g., TensorFlow, PyTorch or MXNet, etc.) will execute the runtime memory management and optimization, which will affect the estimate of the memory consumption. In the example shown in FIG. 3C, the size of the workspace corresponding to the codes in lines 13-15 depends on one of a plurality of strategies for balancing space and time. The time when the codes in line 29 of FIG. 3C are called is affected by the computation graph and the tensor activity. The built-in allocator of the framework may round off and align the size of the space allocated by the codes in lines 4-15 of FIG. 3C. In addition, the framework may also include hidden memory overheads that can hardly be deduced from the program. These factors together decide the memory allocation strategy of the deep learning job at runtime. Moreover, the specific execution environment of the deep learning job, for example, the specifications and the number of computing devices (e.g., central processing unit/graphical processing unit, network, storage device, and the like) for executing the deep learning job and the execution strategy of the deep learning job on the computing devices, also influences the estimate of the memory consumption.

In some implementations, to more accurately predict the resource usage of the deep learning model, the simulating prediction unit 222 may determine, based on the computation graph 201 and the execution information 180, the resource allocation strategy and the execution strategy of the deep learning job at runtime. For example, the resource allocation strategy may include the above mentioned memory allocation strategy and/or other resource allocation strategies. For example, the execution strategy may indicate whether the deep learning job is executed on a single machine or on a plurality of machines, executed in a serial manner or a parallel manner, executed by a single graphical processing unit or by a plurality of graphical processing units, and whether executed in a distributed manner. The simulating prediction unit 222 may adjust, based on at least one of the determined resource allocation strategy and the execution strategy, the static resource usage determined by the static prediction unit 221, so as to obtain the resource usage of the deep learning job during runtime in a specific operating environment.

The above static resource prediction and the simulation-based resource prediction is able to adapt to most deep learning frameworks. However, some frameworks may involve a complicated resource allocation strategy, resulting in fluctuations of the accuracy of the resource prediction. In some implementations, to further optimize the predicted resource usage, the potential resource consumption of the deep learning job during runtime in a specific operating environment may be predicted using a trained machine learning model. For example, the potential resource consumption can hardly be predicted through analyzing the static code and the operating environment, whereas machine learning is a better way for predicting the resource consumption.

In some implementations, a machine learning-based estimate model may be built. For example, the model may be built according to the following manner. First of all, some features and labels may be extracted from the previous program analysis process, as the training data of the machine learning model. The extracted features may include features related to the resource consumption, features related to the computation graph, features related to the execution environment, and the like. The selection of the specific features may be determined according to the specific implementations and the scope of the subject matter described herein is not limited in this regard. In some implementations, the model training may be performed using the machine learning or deep learning model. In some implementations, for example, a loss function L used in the model training may be determined as a Mean Square Error (MSE) between the predicted ratio $Y_v$ and the target ratio $$\frac{Y_e}{Y_p}$$

(or any other target ratios capable of optimizing the prediction result), where $Y_e$ represents the predicted resource usage (such as memory, execution time, floating point operation, and the like) and $Y_r$ represents the actual resource usage. A ratio $$\alpha = \frac{1}{Y_p} - 1$$

of the potential resource consumption to the total resource consumption may be determined using a trained machine learning model (or a deep learning model). For example, when prediction is performed for the memory consumption, the predicted memory usage may be optimized by putting ca into the above equation (1). Similarly, the predicted memory usage for other types of resources may be optimized using the trained machine learning model, so as to improve the accuracy of the resource usage prediction.

It should be appreciated that in addition to predicting the resource usage with the machine learning method, according to the implementations of the subject matter described herein, the resource usage of the deep learning job predicted via the program analysis method is also optimized and calibrated with the machine leaning method. In this way, the output prediction result 190 is interpretable, for example, it can help the deep learning developers find a bottleneck of the deep learning such that the performance of the model is improved by adjusting the model parameters. Besides, the output prediction result 190 is able to engage with other deep learning system assemblies (e.g., AutoML system) or an artificial intelligence platform to increase the productivity of the deep learning. For example, the prediction result can tailor the search space of the model parameters of the deep learning model in advance, to improve search efficiency of the model parameters; the prediction result can also optimize job scheduling of the artificial intelligence platform, thereby enhancing the working efficiency, and the like.

FIG. 4 illustrates a flowchart of a method 400 for predicting the resource usage of the deep learning model in accordance with some implementations of the subject matter described herein. The method 400 may be implemented by the competing device 100, for example, at the resource prediction module 122 in the memory 120 of the computing device 100. At block 410, the computing device 100 obtains information about a deep learning model, the information including the first information for describing the deep learning model and the second information about an operating environment of a job associated with the deep learning model. At block 420, the computing device 100 determines static resource usage of the job based on the first information. At block 430, the computing device determines, based on the first and second information, a strategy of the job during runtime in the operating environment. At block 440, the computing device 100 predicts, based on the strategy and the static resource usage, resource usage of the job during runtime in the operating environment.

In some implementations, the first information includes a configuration parameter of the deep learning model.

In some implementations, the first information includes at least one of: a model file of the deep learning model and program codes of the job.

In some implementations, the second information includes at least one of: a framework type of the deep learning model, specifications and number of computing devices for executing the job in the operating environment, and an execution strategy of the job on the computing devices.

In some implementations, the resource usage includes at least one of: computation power consumption, memory consumption, I/O resource consumption, execution time, and power consumption.

In some implementations, the resource usage includes other resource consumption determined based on at least one of the computation power consumption and the memory consumption.

In some implementations, determining the static resource usage includes: generating, based on the first information, a computation graph corresponding to the deep learning model, where the computation graph includes a plurality of nodes corresponding to a plurality of operators in the deep learning model and edges connecting the plurality of nodes indicate dependency among the plurality of operators; predicting, based on the computation graph and respective resource prediction models of the plurality of operators, respective static resource usage of the plurality of operators; and determining the static resource usage of the job based on the respective static resource usage of the plurality of operators.

In some implementations, the strategy includes at least one of: a resource allocation strategy of the deep learning model, and an execution strategy of the job in the operating environment.

In some implementations, predicting the resource usage of the job during runtime in the operating environment includes: adjusting the static resource usage based on at least one of the resource allocation strategy and the execution strategy, to obtain the resource usage of the job during runtime in the operating environment.

In some implementations, the method 400 further comprises: generating, using a trained machine learning model, a parameter for optimizing the predicted resource usage; and optimizing, based on the parameter, the predicted resource usage.

From the above description, it can be seen that according to the solution for predicting the resource usage of the deep learning model in accordance with implementations of the present disclosure, the usage of various resources of the deep learning model, such as computation power consumption, memory consumption, execution time, and the like, under a specific runtime strategy can be accurately predicted. Moreover, the solution can support various types of inputs and have an extensible architecture, so as to support different types of deep learning frameworks. The prediction result provided by this solution is interpretable and is able to engage with other deep learning system assemblies (e.g., AutoML system) or an artificial intelligence platform to increase the productivity of the deep learning. For example, the prediction result can help the deep learning developers find a bottleneck of the model, such that the performance of the model can be improved by adjusting the model parameters; the prediction result also allows other deep learning system assemblies (e.g., AutoML system) to tailor the search space of the model parameters of the deep learning model in advance, so as to improve search efficiency of the model parameters; the prediction result can also optimize the job execution strategy of the artificial intelligence platform, thereby enhancing the resource utilization rate, and the like.

Some example implementations of the subject matter described herein are listed below.

In one aspect, the subject matter described herein provides a computer-implemented method. The method comprises:

obtaining information about a deep learning model, the information comprising first information for describing the deep learning model and second information about an operating environment of a job associated with the deep learning model; determining static resource usage of the job based on the first information; determining, based on the first information and the second information, a strategy of the job during runtime in the operating environment; and predicting, based on the strategy and the static resource usage, resource usage of the job during runtime in the operating environment.

In some implementations, the first information comprises a configuration parameter of the deep learning model.

In some implementations, the first information comprises at least one of: a model file of the deep learning model and program codes of the job.

In some implementations, the second information comprises at least one of: a framework type of the deep learning model, specifications and number of computing devices for executing the job in the operating environment, and an execution strategy of the job on the computing devices.

In some implementations, the resource usage comprises at least one of: computation power consumption, memory consumption, I/O resource consumption, execution time, and power consumption.

In some implementations, the resource usage comprises other resource consumption determined based on at least one of the computation power consumption and the memory consumption.

In some implementations, determining the static resource usage comprises: generating, based on the first information, a computation graph corresponding to the deep learning model, the computation graph comprising a plurality of nodes corresponding to a plurality of operators in the deep learning model and edges connecting the plurality of nodes indicating dependency among the plurality of operators; predicting, based on the computation graph and respective resource prediction models of the plurality of operators, respective static resource usage of the plurality of operators; and determining the static resource usage of the job based on the respective static resource usage of the plurality of operators.

In some implementations, the strategy comprises at least one of: a resource allocation strategy of the deep learning model, and an execution strategy of the job in the operating environment.

In some implementations, predicting the resource usage of the job during runtime in the operating environment comprises: adjusting the static resource usage based on at least one of the resource allocation strategy and the execution strategy, to obtain the resource usage of the job during runtime in the operating environment.

In some implementations, the method further comprises: generating, using a trained machine learning model, a parameter for optimizing the predicted resource usage; and optimizing, based on the parameter, the predicted resource usage.

In another aspect, the subject matter described herein provides an electronic device. The electronic device comprises: a processing unit; and a memory coupled to the processing unit and comprising instructions stored thereon which, when executed by the processing unit, cause the device to perform acts comprising: obtaining information about a deep learning model, the information comprising first information for describing the deep learning model and second information about an operating environment of a job associated with the deep learning model; determining static resource usage of the job based on the first information; determining, based on the first information and the second information, a strategy of the job during runtime in the operating environment; and predicting, based on the strategy and the static resource usage, resource usage of the job during runtime in the operating environment.

In some implementations, the first information comprises a configuration parameter of the deep learning model.

In some implementations, the first information comprises at least one of: a model file of the deep learning model and program codes of the job.

In some implementations, the second information comprises at least one of: a framework type of the deep learning model, specifications and number of computing devices for executing the job in the operating environment, and an execution strategy of the job on the computing devices.

In some implementations, the resource usage comprises at least one of: computation power consumption, memory consumption, I/O resource consumption, execution time, and power consumption.

In some implementations, the resource usage comprises other resource consumption determined based on at least one of the computation power consumption and the memory consumption.

In some implementations, determining the static resource usage comprises: generating, based on the first information, a computation graph corresponding to the deep learning model, the computation graph comprising a plurality of nodes corresponding to a plurality of operators in the deep learning model and edges connecting the plurality of nodes indicating dependency among the plurality of operators; predicting, based on the computation graph and respective resource prediction models of the plurality of operators, respective static resource usage of the plurality of operators; and determining the static resource usage of the job based on the respective static resource usage of the plurality of operators.

In some implementations, the strategy comprises at least one of: a resource allocation strategy of the deep learning model, and an execution strategy of the job in the operating environment.

In some implementations, predicting the resource usage of the job during runtime in the operating environment comprises: adjusting the static resource usage based on at least one of the resource allocation strategy and the execution strategy, to obtain the resource usage of the job during runtime in the operating environment.

In some implementations, the acts also comprise: generating, using a trained machine learning model, a parameter for optimizing the predicted resource usage; and optimizing, based on the parameter, the predicted resource usage.

In a further aspect, the subject matter described herein provides a computer program product being tangibly stored in a non-transitory computer storage medium and comprising machine-executable instructions which, when executed by a device, causing the device to perform the method of the above aspect.

In another aspect, the subject matter described herein provides a computer-readable medium having machine-executable instructions stored thereon which, when executed by a device, cause the device to perform the method of the above aspect.

The functionality described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, a special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or a server.

In the context of this subject matter described herein, a machine-readable medium may be any tangible medium that may contain, or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, it should be understood that the operations are required to be executed in the particular order shown or in a sequential order, or all operations shown are required to be executed to achieve the expected results. In certain circumstances, multitasking and parallel processing may be advantageous. Likewise, while several specific implementation details are contained in the above discussions, these should not be construed as limitations on the scope of the subject matter described herein. Certain features that are described in the context of separate implementations may also be implemented in combination in a single implementation. Conversely, various features that are described in the context of a single implementation may also be implemented in multiple implementations separately or in any suitable subcombination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising: obtaining information about a deep learning model, the information comprising first information for describing the deep learning model and second information about an operating environment of a job associated with the deep learning model; wherein the first information comprises a configuration parameter of the deep learning model and second information comprises at least one of: a framework type of the deep learning model, specifications and number of computing devices for executing the job in the operating environment, and an execution strategy of the job on the computing devices; determining static resource usage of the job based on the first information; wherein determining the static resource usage comprises: generating, based on the first information, a computation graph corresponding to the deep learning model, the computation graph comprising a plurality of nodes corresponding to a plurality of operators in the deep learning model and edges connecting the plurality of nodes indicating dependency among the plurality of operators; predicting, based on the computation graph and respective resource prediction models of the plurality of operators, respective static resource usage of the plurality of operators; and determining the static resource usage of the job based on the respective static resource usage of the plurality of operators; determining, based on the first information and the second information, a strategy of the job during runtime in the operating environment; and predicting, based on the strategy and the static resource usage, resource usage of the job during runtime in the operating environment.

2. The method of claim 1, wherein the first information comprises at least one of: a model file of the deep learning model and program codes of the job.

3. The method of claim 1, wherein the resource usage comprises at least one of: computation power consumption, memory consumption, I/O resource consumption, execution time, and power consumption.

4. The method of claim 3, wherein the resource usage comprises other resource consumption determined based on at least one of the computation power consumption and the memory consumption.

5. The method of claim 1, wherein the strategy comprises at least one of: a resource allocation strategy of the deep learning model, and an execution strategy of the job in the operating environment.

6. The method of claim 5, wherein predicting the resource usage of the job during runtime in the operating environment comprises: adjusting the static resource usage based on at least one of the resource allocation strategy and the execution strategy, to obtain the resource usage of the job during runtime in the operating environment.

7. The method of claim 1, further comprising: generating, using a trained machine learning model, a parameter for optimizing the predicted resource usage; and optimizing, based on the parameter, the predicted resource usage.

8. An electronic device, comprising: a processing unit; and a memory coupled to the processing unit and comprising instructions stored thereon which, when executed by the processing unit, cause the device to perform acts comprising: obtaining information about a deep learning model, the information comprising first information for describing the deep learning model and second information about an operating environment of a job associated with the deep learning model; wherein the first information comprises a configuration parameter of the deep learning model and second information comprises at least one of: a framework type of the deep learning model, specifications and number of computing devices for executing the job in the operating environment, and an execution strategy of the job on the computing devices; determining static resource usage of the job based on the first information; wherein determining the static resource usage comprises: generating, based on the first information, a computation graph corresponding to the deep learning model, the computation graph comprising a plurality of nodes corresponding to a plurality of operators in the deep learning model and edges connecting the plurality of nodes indicating dependency among the plurality of operators; predicting, based on the computation graph and respective resource prediction models of the plurality of operators, respective static resource usage of the plurality of operators; and determining the static resource usage of the job based on the respective static resource usage of the plurality of operators; determining, based on the first information and the second information, a strategy of the job during runtime in the operating environment; and predicting, based on the strategy and the static resource usage, resource usage of the job during runtime in the operating environment.

9. The device of claim 8, wherein the resource usage comprises at least one of: computation power consumption, memory consumption, I/O resource consumption, execution time, and power consumption.

10. The device of claim 9, wherein the resource usage comprises other resource consumption determined based on at least one of the computation power consumption and the memory consumption.

11. The device of claim 8, wherein determining the static resource usage comprises: generating, based on the first information, a computation graph corresponding to the deep learning model, the computation graph comprising a plurality of nodes corresponding to a plurality of operators in the deep learning model and edges connecting the plurality of nodes indicating dependency among the plurality of operators; predicting, based on the computation graph and respective resource prediction models of the plurality of operators, respective static resource usage of the plurality of operators; and determining the static resource usage of the job based on the respective static resource usage of the plurality of operators.

12. A computer program product being tangibly stored in a non-transitory computer storage medium and comprising machine-executable instructions which, when executed by a device, cause the device to perform acts comprising: obtaining information about a deep learning model, the information comprising first information for describing the deep learning model and second information about an operating environment of a job associated with the deep learning model; wherein the first information comprises a configuration parameter of the deep learning model and second information comprises at least one of: a framework type of the deep learning model, specifications and number of computing devices for executing the job in the operating environment, and an execution strategy of the job on the computing devices: determining static resource usage of the job based on the first information; wherein determining the static resource usage comprises: generating, based on the first information, a computation graph corresponding to the deep learning model, the computation graph comprising a plurality of nodes corresponding to a plurality of operators in the deep learning model and edges connecting the plurality of nodes indicating dependency among the plurality of operators: predicting, based on the computation graph and respective resource prediction models of the plurality of operators, respective static resource usage of the plurality of operators; and determining the static resource usage of the job based on the respective static resource usage of the plurality of operators; determining, based on the first information and the second information, a strategy of the job during runtime in the operating environment; and predicting, based on the strategy and the static resource usage, resource usage of the job during runtime in the operating environment.

* * * * *